United States Patent [19]

Morlotti

[11] Patent Number: 5,365,071
[45] Date of Patent: Nov. 15, 1994

[54] METHOD FOR RECORDING AND REPRODUCING A RADIATION IMAGE, APPARATUS USING SAID METHOD, PANEL FOR STORING A RADIATION IMAGE AND PHOTOSTIMULABLE PHOSPHORS

[75] Inventor: Romano Morlotti, Varazze, Italy

[73] Assignee: Minnesota Mining and Manufacturing Company, St. Paul, Minn.

[21] Appl. No.: 115,826

[22] Filed: Sep. 3, 1993

[30] Foreign Application Priority Data

Oct. 5, 1992 [IT] Italy .................. MI92 A 002293

[51] Int. Cl.$^5$ ............................... C09K 11/61
[52] U.S. Cl. ...................... 250/484.4; 252/301.4 H
[58] Field of Search ............. 250/484.4, 484.2, 581; 252/301.4 H, 301.4 F

[56] References Cited

U.S. PATENT DOCUMENTS

| | | | |
|---|---|---|---|
| 3,448,056 | 6/1969 | Chenot | 252/301.4 |
| 5,034,607 | 7/1991 | McAllister et al. | 250/484.4 |
| 5,138,171 | 8/1992 | Tecotzky et al. | 250/484.4 |

FOREIGN PATENT DOCUMENTS

| | | | |
|---|---|---|---|
| 0107192 | 10/1983 | European Pat. Off. | C09K 11/465 |
| 0111893 | 12/1983 | European Pat. Off. | G21K 4/00 |
| 0174875 | 9/1985 | European Pat. Off. | G21K 4/00 |
| 0304121 | 8/1988 | European Pat. Off. | C09K 11/86 |
| 0391153 | 3/1990 | European Pat. Off. | C08K 11/79 |

OTHER PUBLICATIONS

Abstract—Lanthanum and Yttrium Halo–Silicate Phosphors, W. Lehmann and Th. J. Isaacs, Mar. 1978, Westinghouse Research & Development Center, Pittsburgh, Pa.

Abstract—Very Thin Silicon Nitride Films Grown By Direct Thermal Reaction With Nitrogen, T. Ito. S. Hijiya, T. Nozaki, H. Arakawa, M. Shinoda, Y. Fukukawa, Mar. 1978, Semiconductor Laboratory, Fujitsu Laboratories Ltd., Japan.

Abstract—Preparation and Properties of $Y_3Si_2O_8Cl$; Ce Phosphor, H. Yamada, T. Kano and M. Tanabe, Oct. 18, 1977, Central Research Laboratory of Hitachi Ltd., Japan.

Extract—Phosphors with short afterglow for flying spot tube—Hitachi Ltd., JP 49097785, JP 76017512.

*Primary Examiner*—Paul M. Dzierzynski
*Assistant Examiner*—Richard Henig
*Attorney, Agent, or Firm*—Gary L. Griswold; Walter N. Kirn; Mark A. Litman

[57] ABSTRACT

The present invention relates to new phosphors for use in panels, apparatus and methods for recording and reproducing a high energy radiation image, including the steps of stimulating a phosphor image-wise exposed to radiation and detecting the fluorescent light emitted by said phosphor upon stimulation, said phosphor being a UV-blue-emitting trivalent cerium activated rare earth metal halo-silicate, optionally co-activated with one or more co-activators selected from the group consisting of Tb, Zr and Sm.

25 Claims, No Drawings

METHOD FOR RECORDING AND REPRODUCING A RADIATION IMAGE, APPARATUS USING SAID METHOD, PANEL FOR STORING A RADIATION IMAGE AND PHOTOSTIMULABLE PHOSPHORS

FIELD OF THE INVENTION

This invention refers to a method for recording and reproducing a radiation image by causing a visible radiation stimulable phosphor to absorb high-energy radiation after passing through an object, stimulating said phosphor to release the stored energy as fluorescent light and detecting said fluorescent light, the photostimulable phosphor being a trivalent cerium activated rare earth metal halo-silicate.

BACKGROUND OF THE ART

U.S. Pat. No. 3,859,527 describes a method for recording and reproducing a high-energy radiation image using a panel for storing a radiation image comprising a stimulable phosphor which emits light when stimulated with visible or infrared radiations after exposure to such radiation (wherein high-energy radiation means an electromagnetic wave or corpuscular radiation such as X-rays, α-rays, β-rays, γ-rays, neutrons, ultraviolet rays, or the like).

U.S. Pat. No. 4,258,264 describes a method and apparatus for reproducing a radiation image by stimulating a storing phosphor with stimulating rays, the wavelengths of which are in the range from 600 to 700 nm, and detecting the stimulated light by means of a light detector, the detected light being in the range from 300 to 500 nm.

EP 159,726 describes an alkali earth metal halide phosphor activated with divalent europium having the formula:

$$M''X_2 \cdot aM''X'_2 \cdot bA : xEu^{2+}$$

wherein M" is at least one alkali earth metal selected within the group consisting of Ba, Sr and Ca; both X and X' are at least a halogen selected within the group consisting of Cl, Br and I, X being different from X'; A is at least one oxide selected within the group consisting of $SiO_2$ and $P_2O_5$; a, b and x are numbers respectively satisfying the conditions $0.1 \leq a \leq 10$; $10^{-4} \leq b \leq 0.2$ and $0 < x \leq 0.2$. In the above mentioned patent application there are also described a method for recording and reproducing a radiation image using said phosphor and a radiation image storing panel using such phosphor. The radiations stimulating said phosphor preferably have a wavelength in the range from 500 to 800 nm.

EP 107,192 describes a method for recording and reproducing a radiation image comprising the steps of (i) causing a stimulable phosphor to absorb radiation after passing through an object, (ii) exposing said stimulable phosphor to an electromagnetic wave having a wavelength in the range from 450 to 800 nm to release the stored radiation energy as fluorescent light and (iii) detecting said fluorescent light, wherein said stimulable phosphor is a divalent europium activated complex halide having the formula:

$$M''F X \cdot aM'X' \cdot bM'''X''_2 \cdot cM''''X'''_3 \cdot xA : yEu^{2+}$$

wherein M" is at least an alkali earth metal selected within the group consisting of Ba, Sr and Ca; M' is am alkali metal selected within the group consisting of Li, Na, K, Rb and Cs; M''' is at least a trivalent metal selected within the group consisting of Al, Ga, In and Tl; A is at least a metal oxide; X is at least a halogen selected within the group consisting of Cl, Br and I; each of X', X" and X''' are at least a halogen selected within the group consisting of Cl, Br and I; a, b and c are numbers respectively satisfying the conditions $0 \leq a \leq 2$; $0 \leq b \leq 0.01$; $0 \leq c \leq 0.01$ and $a+b+c \leq 10^{-6}$; x and y are numbers respectively satisfying the conditions $0 < x \leq 0.5$ and $0 < y \leq 0.2$. Such patent application describes also a radiation image storing panel used for such a method.

The phosphors described in the above cited EP 159,726 and 107,192 give the best results, with respect to the emission efficiency, when they are stimulated with radiation having a wavelength in the range from 600 to 700 nm, in particular when they are stimulated with a He-Ne 633 nm laser beam. Such phosphors do not give such good results when they are stimulated with radiation having a wavelength lower than 600 nm.

EP 111,893 describes a method for recording and reproducing a radiation image comprising the steps of (i) causing a radiation image storing panel to absorb a radiation after passing through an object, such a panel containing a divalent europium activated barium fluorochloride phosphor, (ii) exposing said panel to an electromagnetic wave having a wavelength in the range from 400 to 550 nm to release the stored radiation energy as fluorescent light and (iii) detecting said fluorescent light.

EP 174,875 describes a method for converting radiographic images comprising the steps of (i) storing a radiation energy corresponding to a radiographic image in a stimulable phosphor panel, (ii) scanning the panel with a stimulating ray to release the stored energy as a fluorescence, and (iii) detecting the fluorescence to form an image, wherein the stimulable phosphor is represented by the following formula:

$$(M_{1-x}M'_x)X \cdot aM''X'_2 \cdot bM'''X'''_3 \cdot cA : dB$$

wherein M is Cs or Rb; M' is Li, Na, K, Rb or Cs; M" is Be, Mg, Ca, Sr, Ba, Zn, Cd, Cu and Ni; M''' is Sc, Y, La, Ce, Pr, Nd, Pm, Sm, Eu, Gd, Tb, Dy, Ho, Er, Tm, Yb, Lu, Al, Ga and In; A is BaO, MgO, CaO, SrO, BeO, ZnO, $Al_2O_3$, $Y_2O_3$, $La_2O_3$, $In_2O_3$, $SiO_2$, $TiO_2$, $GeO_2$, $SnO_2$, $Nb_2O_2$, $Ta_2O_5$ and $ThO_2$; B is Eu, Tb, Ce, Tm, Dy, Pr, Ho, Nd, Yb, Er, Gd, Lu, Sm, Y, Tl, Na, Ag, Cu, Mg, Pb, Bi, Mn and In; X, X' and X" are F, Cl, Br and I.

EP 304,121 describes a method for recording and reproducing an X-ray image which comprises the steps of: (i) causing a photostimulable phosphor to absorb image-wise modulated X-rays, (ii) photostimulating said phosphor with stimulating electromagnetic radiation selected from visible light and infrared light to release from the phosphor in accordance with the absorbed X-ray electromagnetic radiation different in wavelength characteristic from the radiation used in the photostimulation, and (iii) detecting said light emitted by photostimulation, wherein said phosphor is an europium or cerium activated halo-silicate of formula:

$$M_xM'_zSi_yO_{x+2y}X_{2z}:aA', bA''$$

wherein M and M' are selected from the group consisting of Ca, Sr. Ba, Mg, Cd, Zn, and Pb, X is selected from the group consisting of Cl, Br, and I A' is selected from the group consisting of $Eu^{2+}$ and $Ce^{3+}$ and A" is selected from the group consisting of La, Y, Sc, and the lanthanide elements. The values of x, y and z are in the range of from 0.5 to 3.5, 0.5 to 3.5 and 0.1 to 4.5, respectively.

EP 391,153 describes phosphors to be used in a method for reproducing a radiation image by stimulating a storing phosphor with stimulating rays and detecting the stimulated light by means of a light detector wherein said phosphors are rare earth orthosilicates activated with Ce and/or Tb and co-activated with Zr and/or Sm.

JP patent application 49/97785 discloses an yttrium and gadolinium halo-silicate phosphor for flying spot tubes having the following formula:

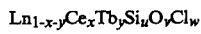
$Ln_{1-x-y}Ce_xTb_ySi_uO_vCl_w$ wherein Ln is Y and/or Gd. $0.001 \leq x \leq 0.15$, $0 \leq y \leq 0.09$, $0.65 \leq u \leq 0.7$, $0.2w \leq 0.6$ and $3+4u=2v+w$.

In the *Journal of the Electrochemical Society*, March 1978, Vol. 125, No. 3, pp. 445–448, W. Lehmann and Th. J. Isaacs describe the luminescent properties of lanthanum and yttrium halo-silicates of the approximate composition $LnSiO_3X$, wherein Ln is La or Y, and X is F, Cl, and Br, activated with several activators, such as, Ce, Tb, Sm, Dy, Eu. The preparation and the structural properties of these phosphors are also described.

H. Yamada, T. Kano and M. Tanabe in *Materials Research Bulletin*, Volume 13, No. 2, pp 101–108 (1978) disclose the luminescent properties of yttrium and gadolinium halo-silicates having composition $Y_3Si_2O_8Cl$ and $Gd_3Si_2O_8Cl$, activated with cerium. A method of preparation and the structural properties are also disclosed.

None of the above patent and literature references relating to stimulable phosphors suggests the use of rare-earth halo-silicate phosphors as photostimulable phosphors in a method similar to that described in the U.S. Pat. Nos. 3,859,527 and 4,239,968.

SUMMARY OF THE INVENTION

The present invention relates to new phosphors for use in panels, apparatus and methods for recording and reproducing a high energy radiation image, including the steps of stimulating a phosphor image-wise exposed to radiation and detecting the fluorescent light emitted by said phosphor upon stimulation, said phosphor being a UV-blue-emitting trivalent cerium activated rare earth metal halo-silicate, optionally co-activated with one or more co-activators selected from the group consisting of Tb, Zr and Sm.

DETAILED DESCRIPTION OF THE INVENTION

The present invention relates to a method for recording and reproducing a radiation image comprising the steps of (i) causing a visible or infrared radiation-stimulable phosphor to absorb high energy radiation after passing through an object, (ii) stimulating said phosphor with visible or infrared radiation to release the energy stored as fluorescent light and (iii) detecting said fluorescent light with light detecting means, said method being characterized in that said phosphor is a UV-blue-emitting trivalent cerium activated rare earth metal halo-silicate, optionally co-activated with one or more co-activators selected from the group consisting of Tb, Zr and Sm.

Preferably, the present invention relates to a method as described above wherein said phosphor is represented by the following general formula:

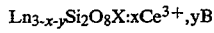
$Ln_{3-x-y}Si_2O_8X:xCe^{3+},yB$ wherein Ln is selected from the group consisting of Sc, Y, La, Ce, Pr, Nd, Pm, Sm, Eu, Gd, Tb, Dy, Ho, Er, Tm, Yb, and Lu, X is F, Cl, or Br, B is Tb, Zr, or Sm and x and y are numbers respectively satisfying the conditions $0 \leq x \leq 0.5$ and $0 \leq y \leq 0.5$ More preferably, the present invention relates to a method as described above wherein said phosphor is represented by the following general formula:

$Ln_{3-x-y}Si_2O_8X:xCe^{3+},yB$ wherein Ln is Y, Gd, and/or Lu, X is F, Cl, and/or Br, B is lb, Zr, and/or Sm and and x and y are numbers respectively satisfying the conditions $0<x<0.5$ and $0<y<0.5$.

In particular, the present invention relates to the method described above wherein the wavelength of said stimulating radiation is in the range of 500 to 1100 nm.

The present invention also relates to the method described above wherein the wavelength of said stimulating radiation is in the range of 500 to 800 nm, more preferably in the range of from 500 to 550 nm and of from 600 to 650 nm.

The method described above is further characterized in that said fluorescent light emitted by the above mentioned phosphor has a wavelength lower than 500 nm, preferably in the range of from 380 to 480 nm.

In another aspect, the present invention relates to an apparatus for recording and reproducing a radiation image comprising (i) means for causing a visible or infrared radiation-stimulable phosphor to absorb high energy radiation after passing through an object, (ii) means for stimulating said phosphor with visible or infrared stimulating radiation to release the energy stored as fluorescent light and (iii) means for detecting said fluorescent light, said apparatus being characterized in that said phosphor is a UV-blue-emitting trivalent cerium activated rare earth metal halo-silicate, optionally co-activated with one or more co-activators selected from the group consisting of Tb, Zr and Sm.

In a further aspect, the present invention relates to a high energy radiation image storage panel having a fluorescent layer comprising a binder and a stimulable phosphor dispersed in said binder, wherein said stimulable phosphor is a UV-blue-emitting trivalent cerium activated rare earth metal halo-silicate, optionally co-activated with one or more co-activators selected from the group consisting of Tb, Zr and Sm.

In a still further aspect, the present invention relates to a UV-blue-emitting trivalent cerium activated rare earth metal halo-silicate photostimulable phosphor, optionally co-activated with one or more co-activators selected from the group consisting of Tb, Zr and Sm.

The method and the apparatus for recording and reproducing a high energy radiation image using the radiation image storage panel of the present invention schematically comprise: a high energy radiation source, an object, a radiation image storage panel, a light source emitting stimulating radiation which stimulates the fluorescent layer of the panel to release the radiation energy stored therein as fluorescent light, a filter for cutting off the radiation emitted by the light source and reflected by the panel at a selected wavelength and for transmitting only the fluorescent light emitted by the panel, and a focusing optic for collecting the light emitted by the panel and passed through the filter. The combination of a photosensor with a photomultiplier is used to detect and convert the light emitted by the panel into electrical signals, the electrical signal being amplified by means of an amplifier and said amplified electrical signal being analyzed by a data analyzer.

Means for causing a visible or infrared radiation-stimulable phosphor to absorb high energy radiation after passing through an object are known in the art, as described in U.S. Pat. No. 4,239,968. These means include a high energy radiation source (such as e.g. an X-ray tube) and a radiation image storage panel similar to that of the present invention including a phosphor different from those of the present invention. When the phosphor is exposed to X-rays, the radiation passes through the object. The intensity of the radiation after passing through the object represents the transmittance factor of the object. An image which represents the transmittance pattern of the object is obtained by means of the radiation impinging upon the panel. The radiation is absorbed by the fluorescent layer of the panel and electrons or holes are generated in the fluorescent layer in proportion to the amount of the absorbed radiation. The electrons or holes are stored in the traps of the phosphors of the present invention. The radiation image stored in the panel is converted to visible radiation upon stimulation with a stimulating radiation source, especially a beam. Means for stimulating said panel with visible or infrared radiations are known in the art to include stimulating radiation sources emitting in the infrared or visible field, such as for example, an Osram QJ Lamp emitting at 800 nm, a He-Ne laser emitting a laser beam at 633 nm, as described in U.S. Pat. No. 4,239,968, and an argon ion laser emitting at 514.5 nm. Stimulation radiation sources having a wavelength of 514.5 and 633 nm are preferred. A scanner apparatus allows the fluorescent layer of the panel to be scanned with stimulating radiation emitted by a light source, as described in U.S. Pat. No. 4,258,264. Focusing means allow said stimulating light to be focused on the panel in a small spot (such as 0.7 mm$^2$), as described in U.S. Pat. No. 4,258,264. The electrons or holes stored in the traps of the photostimulable phosphors are expelled therefrom, and the radiation image stored in the panel is released as fluorescent light.

The luminescence of the fluorescent light emitted by the panel is proportional to the number of the electrons or holes stored in the fluorescent layer of the panel, that is, proportional to the amount of the radiation absorbed therein.

Means for detecting said fluorescent light emitted by the panel are known in the art to include: (a) interference filter means, whose transmission peak is tuned to the wavelength of the signal emitted by the sample to filter-out the unwanted stimulating light (such as e.g. a BG1 or BG3 Schott filter); (b) optical means to collect the light emitted by the panel such as for example light guide members having a linear or arcuate end portion to be located adjacent to a scan line of the photostimulable phosphor to receive and guide the light emitted by the phosphor and an annular end portion to be located adjacent to the light receiving face of the photodetector, such as described in U.S. Pat. No. 4,346,295. Useful optical means to collect the light emitted by the panel are also represented by elliptical mirrors having the concave side turned towards the panel and on opening for the passage of said stimulating radiation, as described in EP 210,505; (c) the combination of a photosensor with a photomultiplier to detect and convert the fluorescent light into electrical signals (such as e.g. a Thorn Emi 9635 QB photomultiplier); (d) a picoammeter for the amplification of the signal (such as e.g. an EG & G Parc Model 181 amplifier) and (e) evaluation means to evaluate the obtained electrical signal (corresponding to the original high energy radiation image), such as e.g. a data analyzer.

The radiation image storage panel of the above described apparatus has a fluorescent layer comprising, as a stimulable phosphor, at least one UV-blue-emitting trivalent cerium activated rare earth metal halo-silicate, optionally co-activated with one or more co-activators selected from the group consisting of Tb, Zr and Sm.

The storage capability of the phosphors of the present invention, as a preliminary hypothesis, is believed to be due to the hole trapping at $Ce^{3+}$ sites and to electron trapping capability of the chloride vacancies which act as F+ centers during X-ray exposure, with respective formation of $Ce^{4+}$ and F centers. The stimulation with visible or infrared radiation is believed to release electrons from F center (F→F+ +e−) promoting their recombination with holes at $Ce^{4+}$ with consequent emission of light ($Ce^{4+}+e^-\rightarrow Ce^{3+}+h\nu$). It is worth noting that when the phosphor of the present invention is co-activated with Zr, or Sm the electron traps are mainly represented by $Zr^{4+}$ and $Sm^{3+}$ ions.

In particular, the radiation image storage panel of the apparatus above has a fluorescent layer comprising, as a stimulable phosphor, at least one phosphor represented by the formula:

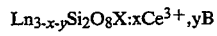

$$Ln_{3-x-y}Si_2O_8X:xCe^{3+},yB$$

wherein Ln is Sc, Y, La, Ce, Pr, Nd, Pm, Sm, Eu, Gd, Tb, Dy, Ho, Er, Tm, Yb, and/or Lu, X is F, Cl, and/or Br, B is Tb, Zr, and/or Sm and x and y are numbers respectively satisfying the conditions $0<x\leq0.5$ and $0\leq y\leq0.5$.

More preferably, the radiation image storage panel of the apparatus above has a fluorescent layer comprising, as a stimulable phosphor, at least one phosphor represented by the formula:

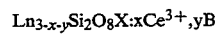

$$Ln_{3-x-y}Si_2O_8X:xCe^{3+},yB$$

wherein Ln is Y, Gd, and/or Lu, X is F, Cl, and/or Br, B is Tb, Zr, and/or Sm and x and y are numbers respectively satisfying the conditions $0<x\leq0.5$ and $0\leq y\leq0.5$.

The phosphor of the present invention, as defined in the above general formula, is characterized in that the fluorescent light emitted upon stimulation by electromagnetic radiation has a wavelength lower than 500 nm, preferably in the range of from 380 to 480 nm.

Furthermore, it has been found that the fluorescent light emitted by the stimulable phosphors of the present invention tends to reach a maximum when stimulated by electromagnetic radiation having wavelength in the range from 500 to 1100 nm, preferably of from 500 to 800 nm.

The above mentioned phosphors of the present invention are thermally processed.

Such thermal processing can be performed according to any method known in the art. In a preferred embodiment the phosphors of the present invention are prepared by the gel method. The gel method comprises the steps of (i) dissolving the reagents in a hydrochloric acid aqueous solution, (ii) mixing the solution with tetraethylorthosilicate (TEOS) together with alcohol (e.g., ethanol), (iii) adding an excess of an ammonia solution up to obtain a pH value of from 8 to 10, so obtaining a gel (iv) drying the gel, (v) firing the mixture in a heat resistant crucible (e.g., an alumina or quartz crucible) at a temperature of from 800° to 1300° C., preferably of from 1000° to 1200° C., for a time ranging from 1 to 10 hours, preferably of from 1 to 5 hours in an inert gas atmosphere, e.g. argon, and (vi) cooling at room temperature before the obtained phosphors are repeatedly washed with water to be purified.

The radiation image storage panels of the present invention normally comprise a fluorescent layer including a binder and, dispersed therein, at least one phosphor of the present invention. The fluorescent layer is formed by dispersing the phosphor in the binder to prepare a coating dispersion, and then applying the coating dispersion according to conventional coating methods to form a uniform layer. Although the fluorescent layer itself can be a radiation image storage panel when the fluorescent layer is self-supporting, the fluorescent layer is generally provided on a substrate to form a radiation image storage panel. Further, a protective layer is usually provided on the surface of the fluorescent layer for physically and chemically protecting the fluorescent layer. Furthermore, a primer layer is sometimes provided between the fluorescent layer and the substrate for closely binding the fluorescent layer to the substrate.

As the binder employed in the fluorescent layer of the radiation image storage panel of the present invention, there can be used for example those binders commonly used for forming layers, such as arabic gum, proteins such as gelatin, polysaccharides such as dextrane, organic polymer binders such as polyvinylbutyral, polyvinylacetate, nitrocellulose, ethylcellulose, vinylidenechloride-vinylchloride, copolymers, polymethyl-methacrylate, polybutyl-methacrylate, vinylchloride-vinylacetate copolymers, polyurethane, cellulose acetate-butyrate, polyvinyl alcohol, and the like.

Generally, the binder is used in an amount of 0.01 to 1 part by weight per one part by weight of the phosphor. However, from the viewpoint of sensitivity and sharpness of the panel obtained, the amount of the binder should preferably be small. Accordingly, in consideration of both the sensitivity and sharpness of the panel and the easiness of application of the coating dispersion, the binder is preferably used in an amount of 0.03 to 0.2 parts by weight per one part by weight of the stimulable phosphor. The thickness of the fluorescent layer is generally within the range of 10 $\mu$m to 1 mm.

In the radiation image storage panel of the present invention, the fluorescent layer is generally coated on a substrate. As the substrate, various materials such as polymer material, glass, wool, cotton, paper, metal, or the like can be used. From the viewpoint of handling the panel as an information recording medium, the substrate should preferably be processed into a sheet or flexible roll. In this connection, as the substrate is preferable an organic polymeric film such as a cellulose acetate film, polyester film, polyethylene-terephthalate film, polyamide film, triacetate film, polycarbonate film, or the like, or ordinary paper, or processed paper such as a photographic paper, baryta paper, resin-coated paper, paper which contains a pigment such as titanium dioxide, or the like. The substrate may have a primer layer on one surface thereof (the surface on which the fluorescent layer is provided) for the purpose of holding the fluorescent layer tightly. As the material of the primer layer, an ordinary adhesive can be used. In providing a fluorescent layer on the substrate or on the primer layer, a coating dispersion comprising the phosphor dispersed in a binder may be directly applied to the substrate or to the primer layer to form the fluorescent layer. Alternatively, a fluorescent layer formed beforehand may be bound to the substrate or to the primer. Where the substrate used is permeable to the stimulating radiations of the phosphor, the radiation image storage panel can be exposed to the stimulating radiation from the substrate side.

Further, in the radiation image storage panel of the present invention, a protective layer for physically and chemically protecting the fluorescent layer is generally provided on the surface of the fluorescent layer intended for exposure (on the side opposite the substrate). When, as mentioned above, the fluorescent layer is self-supporting, the protective layer may be provided on both surfaces of the fluorescent layer. The protective layer may be provided on the fluorescent layer by directly applying thereto a coating dispersion to form the protective layer thereon, or may be provided thereon by bonding thereto the protective layer formed beforehand. As the material of the protective layer, a conventional material for a protective layer such as nitrocellulose, ethylcellulose, cellulose acetate, polyester, polyethylene-terephthalate, and the like can be used.

The radiation image storage panel of the present invention may be colored with a colorant. Further, the fluorescent layer on the radiation image storage panel of the present invention may contain a white powder dispersed therein. By using a colorant or a white powder, a radiation image storage panel which provides a very sharp image can be obtained.

The present invention will be described with more details referring to the following examples.

Approximations in expressions of the numerical values which indicate the molar fractions are the cause of approximation in the numerical value expressing the sum thereof (in some cases 0.9999,- in other cases 0.9998-, rather than 1,0000).

EXAMPLE 1

PREPARATION OF PHOSPHORS

Preparation of $Y_{2.9}Si_2O_8Cl:0.1Ce^{3+}$ Compound 3 of Table 1

A mixture consisting of 3.274 g of $Y_2O_3$, and 0.172 g of $CeO_2$ was dissolved in diluted HCl. 3.362g of tetraethylorthosilicate were added together with ethanol. The solution was added with $NH_4OH$ in excess up to the formation of a gel phase. The gel phase was dried, powdered in a mill, and then fired 3 hours at 1100° C. in an atmosphere of argon and hydrogen (2%). The obtained phosphor was then left to cool in the air to room temperature, pulverized, sieved in cold water and dried at 150° C.

Compounds 1, 2, 4 and 5 of Table 1 were prepared in the same way by using the appropriate amount of ingredients. Compounds 6 and 7 were prepared in a similar way, by adding the stoichiometric amount of $ZrO_2$ and $Sm_2O_3$, respectively.

Preparation of $Y_{2.3}Lu_{0.6}Si_2O_8Cl:0.1Ce^{3+}$ Compound 8 of Table 1

A mixture consisting of 2.619 g of $Y_2O_3$, 1.154 g of $Lu_2O_3$, and 0.172 g of $CeO_2$ was dissolved in diluted HCl. 3.362 g of tetraethylorthosilicate were added together with ethanol. The solution was added with $NH_4OH$ in excess up to the formation of a gel phase. The gel phase was dried, powdered in a mill, and then fired 3 hours at 1100° C. in an atmosphere of argon and hydrogen (2%). The obtained phosphor was then left to cool in the air to room temperature, pulverized, sieved in cold water and dried at 150° C.

Preparation of $Y_{1.1}Lu_{1.8}Si_2O_8Cl:0.1Ce^{3+}$ Compound 9 of Table 1

A mixture consisting of 1.309 g of $Y_2O_3$, 3.461 g of $Lu_2O_3$, and 0.172 g of $CeO_2$ was dissolved in diluted HCl. 3.362 g of tetraethylorthosilicate were added together with ethanol. The solution was added with $NH_4OH$ in excess up to the formation of a gel phase. The gel phase was dried, powdered in a mill, and then fired 3 hours at 1100° C. in an atmosphere of argon and hydrogen (2%). The obtained phosphor was then left to cool in the air to room temperature, pulverized, sieved in cold water and dried at 150° C.

Preparation of $Y_{0.5}Lu_{2.4}Si_2O_8Cl:0.1Ce^{3+}$ Compound 10 of Table 1

A mixture consisting of 0.655 g of $Y_2O_3$, 4.614 g of $Lu_2O_3$, and 0.172 g of $CeO_2$ was dissolved in diluted HCl. 3.362 g of tetraethylorthosilicate were added together with ethanol. The solution was added with $NH_4OH$ in excess up to the formation of a gel phase. The gel phase was dried, powdered in a mill, and then fired 3 hours at 1100° C. in an atmosphere of argon and hydrogen (2%). The obtained phosphor was then left to cool in the air to room temperature, pulverized, sieved in cold water and dried at 150° C.

Preparation of $Y_{0.5}Lu_{2.4}Si_2O_8Cl:0.1Ce^{3+}$, $0.001Tb^{3+}$ Compound 11 of Table 1

A mixture consisting of 0.655 g of $Y_2O_3$, 4.614 g of $Lu_2O_3$, 0.172 g of $CeO_2$, and 0.0019 g of $Tb_4O_7$ was dissolved in diluted HCl. 3.362 g of tetraethylorthosilicate were added together with ethanol. The solution was added with $NH_4OH$ in excess up to the formation of a gel phase. The gel phase was dried, powdered in a mill, and then fired 3 hours at 1100° C. in an atmosphere of argon and hydrogen (2%). The obtained phosphor was then left to cool in the air to room temperature, pulverized, sieved in cold water and dried at 150° C.

Preparation of $Y_{0.5}Lu_{2.4}Si_2O_8Cl:0.1Ce^{3+},0.001Tb^{3+},0.001Zr^{4+}$ Compound 12 of Table 1

A mixture consisting of 0.655g of $Y_2O_3$, 4.614 g of $Lu_2O_3$, 0.172 g of $CeO_2$, 0.0034 g of $ZrO_2$, and 0.0019 g of $Tb_4O_7$ was dissolved in diluted HCl. 3.362 g of tetraethylorthosilicate were added together with ethanol. The solution was added with $NH_4OH$ in excess up to the formation of a gel phase. The gel phase was dried, powdered in a mill, and then fired 3 hours at 1100° C. in an atmosphere of argon and hydrogen (2%). The obtained phosphor was then left to cool in the air to room temperature, pulverized, sieved in cold water and dried at 150° C.

Preparation of $Lu_{2.9}Si_2O_8Cl:0.1Ce^{3+}$ Compound 13 of Table 1

A mixture consisting of 5.770 g of $Lu_2O_3$, and 0.172 g of $CeO_2$ was dissolved in diluted HCl. 3.362 g of tetraethylorthosilicate were added together with ethanol. The solution was added with $NH_4OH$ in excess up to the formation of a gel phase. The gel phase was dried, powdered in a mill, and then fired 3 hours at 1100° C. in an atmosphere of argon and hydrogen (2%). The obtained phosphor was then left to cool in the air to room temperature, pulverized, sieved in cold water and dried at 150° C.

Preparation of $Y_{1.3}Gd_{1.2}Lu_{0.4}Si_2O_8Cl:0.1Ce^{3+}$ Compound 14 of Table 1

A mixture consisting of 1.526g of $Y_2O_3$, 2.101 g of $Gd_2O_3$, 0.768 g of $Lu_2O_3$, and 0.172 g of $CeO_2$ was dissolved in diluted HCl. 3.362 g of tetraethylorthosilicate were added together with ethanol. The solution wasa added with $NH_4OH$ in excess up to the formation of a gel phase. The gel phase was dried, powdered in a mill, and then fired 3 hours at 1100° C. in an atmosphere of argon and hydrogen (2%). The obtained phosphor was then left to cool in the air to room temperature, pulverized, sieved in cold water and dried at 150° C.

TABLE 1

| Phosphor Sample | Formula |
| --- | --- |
| 1 | $Y_{2.999}Si_2O_8Cl:0.001Ce^{3+}$ |
| 2 | $Y_{2.99}Si_2O_8Cl:0.01Ce^{3+}$ |
| 3 | $Y_{2.9}Si_2O_8Cl:0.1Ce^{3+}$ |
| 4 | $Y_{2.8}Si_2O_8Cl:0.2Ce^{3+}$ |
| 5 | $Y_{2.7}Si_2O_8Cl:0.3Ce^{3+}$ |
| 6 | $Y_{2.999}Si_2O_8Cl:0.001Ce^{3+}+0.001Zr^{4+}$ |
| 7 | $Y_{2.999}Si_2O_8Cl:0.001Ce^{3+}+0.001Sm^{3+}$ |
| 8 | $Y_{2.3}Lu_{0.6}Si_2O_8Cl:0.1Ce^{3+}$ |
| 9 | $Y_{1.1}Lu_{1.8}Si_2O_8Cl:0.1Ce^{3+}$ |
| 10 | $Y_{0.5}Lu_{2.4}Si_2O_8Cl:0.1Ce^{3+}$ |
| 11 | $Y_{0.5}Lu_{2.4}Si_2O_8Cl:0.1Ce^{3+}+0.001Tb^{3+}$ |
| 12 | $Y_{0.5}Lu_{2.4}Si_2O_8Cl:0.1Ce^{3+}+0.001Tb^{3+}+0.001Zr^{4+}$ |
| 13 | $Y_{2.9}Si_2O_8Cl:0.1Ce^{3+}$ |
| 14 | $Y_{1.3}Gd_{1.2}Lu_{0.4}Si_2O_8Cl:0.1Ce^{3+}$ |

PHOSPHOR EVALUATION

EXAMPLE 2

Samples of phosphors of Table 1 were exposed to 40 KVp and 20 mA X-ray radiation for 10 seconds. After 2 minutes they were then stimulated with a 514.5 nm light beam, which was obtained by causing the light to be emitted by a QJ Lamp 100 W 12 V (Osram, HLX-64625-FCR) and passed through a Melles-Griot type FIL004 narrow band filter (8 mm opening). The light power was 0.017 $\mu W/cm^2$ as measured by a EG & G Parc Model 450 radiometer. Stimulation was performed for 60 seconds by using a Programmable Shutter Supply (Ealong). Photostimulated light emitted by the phosphor was collected by a photomultiplier (Emi Thorn 9635 QB type) and converted into electrical signals. The unwanted stimulating light reflected by the phosphor was absorbed by a collecting filter (Schott BG-1 with 8.5 mm opening). Such a filter is capable of transmitting the radiations having a wavelength between 270 and 500 nm (transmitting at least 90% of the signal between 270 and 480 nm) and preventing the passage of the radiations having a wavelength between 530 and 670 nm. To improve the blocking power for 514.5 nm radiation, two interferential filters have been used; their transmittance is less than 1% at about 514.5 nm and more than 70% in the range of from 380 to 490 nm.

The electrical signal was amplified by the combination of an EG & G Parc Model 181 pre-amplifier and an EG & G Parc Model 113 amplifier. The signal was then evaluated by a Data Precision 6000, Division Analogic Corp., data analyzer.

EXAMPLE 3

Samples of phosphors of table 1 were exposed to X-ray radiations as described in Example 2, with the only difference being that the phosphors were stimulated with a 633 nm light beam obtained by causing the light to be emitted by a 0.7 mV He-Ne laser and passed through a Melles-Griot type FIL026 filter. The interferential filters of Example 2 were omitted.

EXAMPLE 4

Samples of phosphors of table 1 were exposed to X-ray radiations as described in Example 2, with the only difference being that the phosphors were stimulated with a 800 nm light beam obtained by causing such light to be emitted by a QJ Lamp (Osram, HLX-64625-FCR) and passed through Melles-Griot type FIL007 plus FIL015 and Schott RG850 filters. The light power was 0.2 $\mu W/cm^2$ measured as above. The collecting filter BG-1 of Example 2 was omitted because the photomultiplier was not sensitive to the stimulation light having a wavelength of 800 nm.

EXAMPLE 5

The following Table 2 reports the photostimulated emitted light emission values of the phosphors of table 1 and processed as described in Examples 2, 3 and 4. In comparison a sample of $Y_2SiO_5:0.001Ce^{3+}$, $0.001Sm^3$ phosphor (Sample 15) corresponding to Compound 1 of EP 391,153 was evaluated under the same conditions of Examples 2, 3 and 4, respectively. In Table 2, the emission efficiency value of the reference phosphor (compound 3) has been normalized to 100 for each stimulation at 514.5, 633 and 800 nm. This does not mean that the emission efficiency value of such phosphor when stimulated at 633 nm is equal to the emission efficiency value of the same phosphor when stimulated at 800 nm and/or 514.5 nm.

TABLE 2

| Sample | Emission Efficiency | | |
|---|---|---|---|
| | 514.5 | 633 | 800 |
| 1 | 45 | 10 | 15 |
| 2 | 85 | 70 | 30 |
| 3 | 100 | 100 | 100 |
| 4 | 100 | 100 | 100 |
| 5 | 65 | 50 | |
| 6 | 250 | 60 | 40 |
| 7 | 30 | 45 | 60 |
| 8 | 140 | 175 | 55 |
| 9 | 230 | 280 | 10 |
| 10 | 195 | 250 | 10 |
| 11 | 200 | 400 | 8 |
| 12 | 220 | 300 | 4 |
| 13 | 600 | 1370 | 40 |
| 14 | 175 | 190 | 25 |
| 15 | 100 | 330 | 280 |

The data of Samples 1 to 5 show that the light emission efficiency of the phosphor of the present invention has a maximum with a $Ce^{3+}$ content of from 0.1 to 0.2 atoms per mole of phosphor. The comparison of the data of Sample 1 with Samples 6 and 7, and of Sample 10 with Samples 11 and 12 clearly shows that the presence of a co-activator increases the light emission efficiency. In particular Tb and Zr increase the light emission efficiency when the phosphor is stimulated at 514.5 or 633 nm, while Sm increases the light emission efficiency when the phosphor is stimulated at 800 nm.

Moreover, it is worth noting that the higher quantity of Y increases the light emission efficiency when the phosphor is stimulated at 800 nm and the higher quantity of Lu increases the light emission efficiency when the phosphor is stimulated at 514.5 or 633 nm. The best results are obtained with Sample 3 for stimulation at 800 nm, and with Sample 13 for stimulation at 514.5 and 633 nm.

I claim:

1. A method for recording and reproducing a radiation image comprising the steps of (i) causing a visible or infrared radiation-stimulable phosphor to absorb a high energy radiation which has passed through an object, (ii) stimulating said phosphor with visible or infrared radiations to release the energy stored as fluorescent light, and (iii) detecting said fluorescent light with light detecting means, characterized in that said phosphor is a UV-blue-emitting trivalent cerium activated rare earth metal halo-silicate.

2. A method for recording and reproducing a radiation image comprising the steps of (i) causing a visible or infrared radiation-stimulable phosphor to absorb a high energy radiation which has passed through an object, (ii) stimulating said phosphor with visible or infrared radiation to release energy stored as fluorescent light, and (iii) detecting said fluorescent light with light detecting means, said method being characterized in that said phosphor is a UV-blue emitting trivalent cerium activated rare earth metal halo-silicate, wherein said phosphor is co-activated with at least one co-activator selected from the group consisting of Tb, Zr and Sm.

3. The method for recording and reproducing a radiation image of claim 2, wherein said phosphor is represented by the following general formula:

$$Ln_{3-x-y}Si_2O_8X:xCe^{3+},yB$$

wherein Ln is selected from the group consisting of Sc, Y, La, Ce, Pr, Nd, Pm, Sm, Eu, Gd, Tb, Dy, Ho, Er, Tm, Yb, and Lu, X is selected from the group consisting of F, Cl, and Br, B is selected from the group consisting of Tb, Zr, and Sm and x and y are numbers respectively satisfying the conditions $0 < x \leq 0.5$ and $0 \leq y \leq 0.5$.

4. The method for recording and reproducing a radiation image of claim 2, wherein said phosphor is represented by the following general formula:

$$Ln_{3-x-y}Si_2O_8X:xCe^{3+},yB$$

wherein Ln is selected from the group consisting of Y, Gd, and Lu, X is selected from the group consisting of F, Cl, and Br, B is selected from the group consisting of Tb, Zr, and Sm and x and y are numbers respectively satisfying the conditions $0 < x \leq 0.5$ and $0 \leq y \leq 0.5$.

5. The method for recording and reproducing a radiation image of claim 1, wherein said phosphor is stimulated with a radiation having a wavelength in the range of 500 to 1100 nm.

6. The method for recording and reproducing a radiation image of claim 1, wherein said phosphor is stimulated with a radiation having a wavelength in the range of 500 to 800 nm.

7. The method for recording and reproducing a radiation image of claim 1, wherein said phosphor emits a fluorescent light having a wavelength lower than 500 nm.

8. The method for recording and reproducing a radiation image of claim 1, wherein said phosphor emits a fluorescent light having a wavelength of from 380 to 480 nm.

9. An improved apparatus for recording and reproducing a radiation image comprising (1) means for causing a visible or infrared radiation-stimulable phosphor to absorb a high energy radiation which has passed through an object, (ii) means for stimulating said phosphor with visible or infrared radiations to release the energy stored as fluorescent light, and (iii) means for detecting said fluorescent light, said apparatus being characterized in that said phosphor is a UV-blue-emitting trivalent cerium activated rare earth metal halo-silicate phosphor.

10. An improved apparatus for recording and reproducing a radiation image comprising (i) means for causing a visible or infrared radiation-stimulable phosphor to absorb a high energy radiation which has passed through an object, (ii) means for stimulating said phosphor with visible or infrared radiation to release stored energy as fluorescent light, and (iii) means for detecting fluorescent light, said apparatus being characterized in that said phosphor is a UV-blue emitting trivalent cerium activated rare earth metal halo-silicate phosphor, wherein said phosphor is co-activated with at least one co-activator selected from the group consisting of Tb, Zr and Sm.

11. The apparatus for recording and reproducing a radiation image of claim 10, wherein said phosphor is represented by the following general formulas:

$$Ln_{3-x-y}Si_2O_8X:xCe^{3+},yB$$

wherein Ln is selected from the group consisting of Sc, Y, La, Ce, Pr, Nd, Pm, Sm, Eu, Gd, Tb, Dy, Ho, Er, Tm, Yb, and Lu, X is selected from the group consisting of F, Cl, and Br, B is selected from the group consisting of Tb, Zr, and Sm and x and y are numbers respectively satisfying the conditions $0 < x \leq 0.5$ and $0 \leq y \leq 0.5$.

12. The apparatus for recording and reproducing a radiation image of claim 10, wherein said phosphor is represented by the following general formulas:

$$Ln_{3-x-y}Si_2O_8X:xCe^{3+},yB$$

wherein Ln is selected from the group consisting of Y, Gd, and Lu, X is selected from the group consisting of F, Cl, and Br, B is selected from the group consisting of Tb, Zr, and Sm and x and y are numbers respectively satisfying the conditions $0 < x \leq 0.5$ and $0 \leq y \leq 0.5$.

13. The apparatus for recording and reproducing a radiation image of claim 9, wherein said phosphor is stimulated with a radiation having a wavelength in the range of 500 to 1100 nm.

14. The apparatus for recording and reproducing a radiation image of claim 9, wherein said phosphor emits a fluorescent light having a wavelength lower than 500 nm.

15. The apparatus for recording and reproducing a radiation image of claim 9, wherein said phosphor emits a fluorescent light having a wavelength of from 380 to 480 nm.

16. A radiation image storage panel having a fluorescent layer comprising a binder and a stimulable phosphor dispersed in said binder characterized in that said phosphor is a UV-blue-emitting trivalent cerium activated rare earth metal halo-silicate.

17. A radiation image storage panel having a fluorescent layer comprising a binder and a stimulable phosphor dispersed in said binder characterized in that said phosphor is a UV-blue emitting trivalent cerium activated rare earth metal halo-silicate, wherein said phosphor is co-activated with at least one co-activator selected from the group consisting of Tb, Zr and Sm.

18. The radiation image storage panel of claim 17, wherein said phosphor is represented by the following general formulas:

$$Ln_{3-x-y}Si_2O_8X:xCe^{3+},yB$$

wherein Ln is selected from the group consisting of Sc, Y, La, Ce, Pr, Nd, Pm, Sm, Eu, Gd, Tb, Dy, Ho, Er, Tm, Yb, and Lu, X is selected from the group consisting of F, Cl, and Br, B is selected from the group consisting of Tb, Zr, and Sm and x and y are numbers respectively satisfying the conditions $0 < x \leq 0.5$ and $0 \leq y \leq 0.5$.

19. The radiation image storage panel of claim 17, wherein said phosphor is represented by the following general formulas:

$$Ln_{3-x-y}Si_2O_8X:xCe^{3+},yB$$

wherein Ln is selected from the group consisting of Y, Gd, and Lu, X is selected from the group consisting of F, Cl, and Br, B is selected from the group consisting of Tb, Zr, and Sm and x and y are numbers respectively satisfying the conditions $0 < x \leq 0.5$ and $0 \leq y \leq 0.5$.

20. A photostimulable phosphor selected from the group of UV-blue-emitting trivalent cerium activated rare earth metal halo-silicates.

21. A photostimulable phosphor selected from the group of UV-blue emitting trivalent cerium activated rare earth metal halo-silicate, wherein said phosphor is co-activated with at least one co-activator selected from the group consisting of Tb, Zr and Sm.

22. The photostimulable phosphor of claim 21, wherein said phosphor is represented by the following general formulas:

$$Ln_{3-x-y}Si_2O_8X:xCe^{3+},yB$$

wherein Ln is selected from the group consisting of Sc, Y, La, Ce, Pr, Nd, Pm, Sm, Eu, Gd, Tb, Dy, Ho, Er, Tm, Yb, and Lu, X is selected from the group consisting of F, Cl, and Br, B is selected from the group consisting of Tb, Zr, and Sm and x and y are numbers respectively satisfying the conditions $0 < x \leq 0.5$ and $0 \leq y \leq 0.5$.

23. The photostimulable phosphor of claim 21, wherein said phosphor is represented by the following general formulas:

$Ln_{3-x-y}Si_2O_8X:xCe^{3+},yB$ wherein Ln is selected from the group consisting of Y, Gd, and Lu, X is selected from the group consisting of F, Cl, and Br, B is selected from the group consisting of Tb, Zr, and Sm and x and y are numbers respectively satisfying the conditions $0<x\leq0.5$ and $0\leq y\leq0.5$.

24. The photostimulable phosphor of claim 20, wherein said phosphor emits a fluorescent light having a wavelength lower than 500 nm.

25. The photostimulable phosphor of claim 20, wherein said phosphor emits a fluorescent light having a wavelength of from 380 to 480 nm.

* * * * *

UNITED STATES PATENT AND TRADEMARK OFFICE
CERTIFICATE OF CORRECTION

PATENT NO. : 5,365,071
DATED : November 15, 1994
INVENTOR(S) : Morlotti

It is certified that error appears in the above-indentified patent and that said Letters Patent is hereby corrected as shown below:

Column 4, line 21, delete "Br, B is lb, Zr,"
and insert --Br, B is Tb, Zr,--.

Signed and Sealed this

Eighteenth Day of April, 1995

Attest:

BRUCE LEHMAN

*Commissioner of Patents and Trademarks*

*Attesting Officer*